(No Model.)
F. L. BROWN & J. M. ST. JOHN.
TRUCK.
No. 552,467. Patented Dec. 31, 1895.
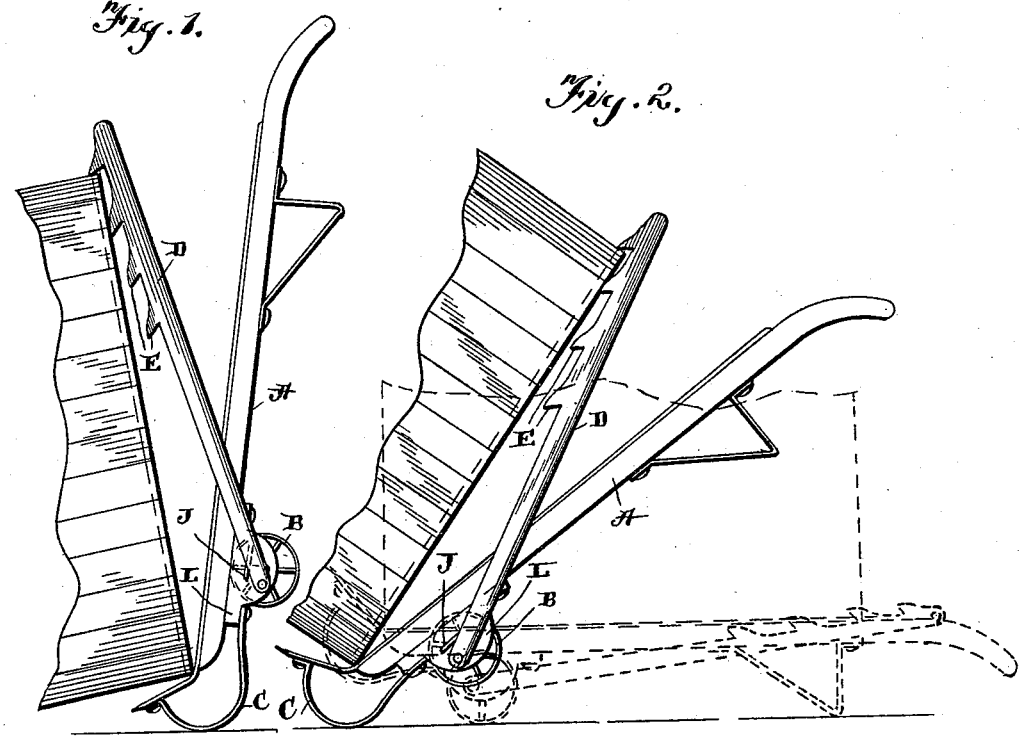
Witnesses:
Geo. E. Fuchs
James V. Beard
Inventors
F. L. Brown
J. M. St. John
By Pattison & Nesbit
Attorneys
ANDREW B.GRAHAM. PHOTO-LITHO. WASHINGTON.D.C.

UNITED STATES PATENT OFFICE.

FINIS LEE BROWN AND JOE M. ST. JOHN, OF PADUCAH, KENTUCKY.

TRUCK.

SPECIFICATION forming part of Letters Patent No. 552,467, dated December 31, 1895.

Application filed July 25, 1895. Serial No. 557,092. (No model.)

*To all whom it may concern:*

Be it known that we, FINIS LEE BROWN and JOE M. ST. JOHN, of Paducah, in the county of McCracken and State of Kentucky, have invented certain new and useful Improvements in Trucks; and we do hereby declare the following to be a full, clear, and exact description of the invention, such as will enable others skilled in the art to which it pertains to make and use it, reference being had to the accompanying drawings, which form part of this specification.

This invention pertains to improvements in trucks; and the object of the same is to provide an improved grappling device for engaging the box, bale or barrel for the purpose of assisting in loading the same upon the truck and thus avoid much of the labor incident to loading in the old way.

A further object of the invention is to provide an improved lock for holding stationary the truck-wheels while the truck is being loaded.

With these objects in view the invention consists in the novel features of construction hereinafter fully described and claimed, and illustrated by the accompanying drawings, in which—

Figure 1 is an elevation of our improved truck, showing the same in position for loading a box. Fig. 2 is a similar view showing the truck tilted backward until the box is about to fall thereon by force of gravity.

A designates the truck-frame, and B the wheels, all of the ordinary and well-known construction. Secured to each side of the truck and forward of its wheels is a curved turning-head C, which extends to the toothed lifting-lip of the truck, which serves to effect easy backward movement of the truck being loaded, from the position shown in Fig. 1.

The grappling device for engaging the article to be handled for drawing it backward upon the truck consists of arms D pivoted at their lower ends to the journals of wheels B, the said arms being secured outside of the main truck-frame and connected by rod F at their upper ends. The upper or forward sides of these arms are formed with teeth or notches E, so as to operate upon articles of different sizes in the manner illustrated in Figs. 1 and 2.

The truck is positioned in an upright manner to the article to be moved, and the grapple-arms are swung forward until one of the sets of teeth engage the same, as indicated, and then a backward and downward pressure upon the handles of the truck will cause the box, bale or barrel to be turned backward thereon until the article falls upon the truck by force of gravity, when the arms will fall back in position upon the truck and entirely out of the way.

Locking spring-arms J having the inwardly-turned ends K are secured to boxings L of wheels B, the same normally projecting outward and away from the wheel-spokes, as in Fig. 3. When, however, the grapple-arms are turned forward for use they move along the said spring-arms, causing the same to be compressed or be pushed inward with the effect that the inwardly-turned ends are engaged with the wheel's spokes, and the latter are prevented from turning. They are held thus locked until the article has fallen backward upon the truck and the arms have resumed an inoperative position, when they will automatically disengage the wheels. This feature is of special convenience, for frequently in loading heavy articles when the truck is tilted backward sufficiently far to permit the wheels to rest upon the floor, the pressure upon the same in getting the article positioned will frequently displace it to the great inconvenience of the operator.

Having thus fully described our invention, what we claim, and desire to secure by Letters Patent, is—

1. The combination of the truck frame having the parallel side bars and the lip at the lower end, the elongated grapple arms D pivoted at their lower ends on the outer sides of the side bars and at points a short distance above the lower end of the truck, and cross bar F connecting the free ends of arms D and adapted to rest upon the top surface of the truck when not in use, whereby when the truck lip is inserted beneath the article to be moved and the grapple arms swung forward to engage said article the latter will be drawn to position on the truck by a backward movement of the upper end of the truck, when the grapple arms will drop to position parallel with the frame bars and out of the way, substantially as shown and described.

2. The combination of the truck frame, the truck wheels, the forwardly turning grapple arms for engaging the articles to be moved, and a locking device for the wheels which is operated automatically by the grapple arms, substantially as shown and described.

3. The combination of the truck frame, the wheels, the boxings therefor, the spring arms secured at one end to the boxings and having their opposite ends turned inward to engage the wheels, and the grapple arms which are adapted to be turned forward for engaging the article to be moved and which at the same time compress the said spring arms inward so as to engage their inturn ends with the truck wheels, substantially as shown and described.

In testimony whereof we affix our signatures in presence of two witnesses.

FINIS LEE BROWN.
     JOE M. ST. JOHN.

Witnesses:
 LEVI J. ROUSE,
 S. B. GALT.